United States Patent [19]
Lambrecht et al.

[11] Patent Number: 5,935,232
[45] Date of Patent: Aug. 10, 1999

[54] VARIABLE LATENCY AND BANDWIDTH COMMUNICATION PATHWAYS

[75] Inventors: J. Andrew Lambrecht, Austin; Alfred C. Hartmann, Round Rock, both of Tex.

[73] Assignee: Advanced Micro Devices, Inc., Sunnyvale, Calif.

[21] Appl. No.: 08/969,860

[22] Filed: Nov. 14, 1997

Related U.S. Application Data

[63] Continuation-in-part of application No. 08/559,661, Nov. 20, 1995, Pat. No. 5,754,807.

[51] Int. Cl.$^6$ .................................................... G06F 13/00
[52] U.S. Cl. ........................................... 710/128; 710/127
[58] Field of Search .................................... 709/238–242; 710/126–129

[56] References Cited

U.S. PATENT DOCUMENTS

| | | |
|---|---|---|
| 4,096,571 | 6/1978 | Vander Mey . |
| 4,339,808 | 7/1982 | North . |

(List continued on next page.)

FOREIGN PATENT DOCUMENTS

| | | |
|---|---|---|
| 0 121 030 A1 | 10/1984 | European Pat. Off. . |
| 0 629 955 A1 | 12/1994 | European Pat. Off. . |
| 0 718 774 A1 | 6/1996 | European Pat. Off. . |
| 2 165 726 | 4/1985 | United Kingdom . |
| 93/16434 | 8/1993 | WIPO . |
| 95/28786 | 10/1995 | WIPO . |

OTHER PUBLICATIONS

Itano, et al "HIRB: A Hierarchical Ring Bus" University of Tsukuba, Japan, Proceedings of the Nineteenth Annual Hawaii International Conference on System Sciences, 1986, pp. 206–213.

Kim, et al, "A Relational Dataflow Database Machine Based on Heirarchical Ring Network," Korea Advanced Institute of Technology, Proceedings of the International Conference on Fifth Generation Computer Systems, 2984, pp. 489–496.
Su, et al, "Adaptive Fault–Tolerant Deadlock–Free Routing of the Slotted Ring Multiprocessor," IEEE Transactions on Computers, vol. 45, No. 6, Jun. 1996, pp. 666–683.

(List continued on next page.)

*Primary Examiner*—Ayaz R. Sheikh
*Assistant Examiner*—Jigar Pancholi
*Attorney, Agent, or Firm*—Conley, Rose & Tayon; Jeffrey C. Hood; Louis H. Iselin

[57] ABSTRACT

A system and method for choosing communication pathways for data transfers on a computer chip based on desired latency and bandwidth characteristics. On a computer chip including a network of resources, those resources are allocated based upon the needs of the various components of the computer chip. Typical resources on the computer chip include a first bus with a plurality of data lines and control lines and having first bandwidth and latency characteristics, a second bus with a plurality of data lines and control lines having second bandwidth and latency characteristics, and a plurality of devices coupled to the first bus and second bus. Each device includes interface logic for accessing and performing transfers on the first and second buses. Each device is operable to select either the first or second bus depending on desired bandwidth and latency characteristics. Normally the first bandwidth is greater than the second bandwidth. Each device selects the first bus for higher speed transfers or the second bus for lower speed transfers. When the first latency is shorter than the second latency, each of the devices select the first bus for lower latency transfers and the second bus for higher latency transfers. Other characteristics which may be varies by each device according to the transmission needs of the particular device include clock rate, block size, and bus protocol depending upon desired bandwidth and latency characteristics. For highest possible bandwidth transfers, a multiple bus transfer may be requested by any device.

28 Claims, 8 Drawing Sheets

U.S. PATENT DOCUMENTS

| | | |
|---|---|---|
| 4,682,282 | 7/1987 | Beasley . |
| 4,953,081 | 8/1990 | Feal et al. . |
| 4,972,313 | 11/1990 | Getson, Jr. et al. . |
| 4,974,148 | 11/1990 | Matteson . |
| 5,146,596 | 9/1992 | Whittaker et al. . |
| 5,245,322 | 9/1993 | Dinwiddie, Jr. et al. . |
| 5,265,223 | 11/1993 | Brockmann et al. . |
| 5,274,763 | 12/1993 | Banks . |
| 5,274,784 | 12/1993 | Arimilli et al. . |
| 5,278,974 | 1/1994 | Lemmon et al. ................. 395/550 |
| 5,345,566 | 9/1994 | Tanji et al. . |
| 5,392,033 | 2/1995 | Oman et al. . |
| 5,396,602 | 3/1995 | Amini et al. . |
| 5,404,463 | 4/1995 | McGarvey . |
| 5,463,624 | 10/1995 | Hogg et al. . |
| 5,467,454 | 11/1995 | Sato . |
| 5,471,590 | 11/1995 | Melo et al. . |
| 5,524,235 | 6/1996 | Larson et al. . |
| 5,526,017 | 6/1996 | Wilkie . |
| 5,533,205 | 7/1996 | Blackledge, Jr. et al. . |
| 5,535,341 | 7/1996 | Shah et al. . |
| 5,546,546 | 8/1996 | Bell et al. . |
| 5,572,686 | 11/1996 | Nunziata et al. . |
| 5,574,867 | 11/1996 | Khaira . |
| 5,583,999 | 12/1996 | Sato et al. . |
| 5,606,557 | 2/1997 | Kuroshita et al. ................. 370/364 |
| 5,627,975 | 5/1997 | Bryant et al. ..................... 395/307 |
| 5,627,976 | 5/1997 | McFarland et al. ............... 395/308 |
| 5,682,484 | 10/1997 | Lambrecht . |
| 5,710,892 | 1/1998 | Goodnow et al. ................. 395/307 |
| 5,748,806 | 5/1998 | Gates .............................. 395/306 |
| 5,754,548 | 5/1998 | Hoekstra et al. ................. 370/402 |
| 5,754,807 | 5/1998 | Lambrecht et al. . |

OTHER PUBLICATIONS

Gustavson, D.B., "Scalable Coherent Interface and Related Standards Projects," IEEE vol. 12, No. 1, pp. 10–22, Feb. 1992.

Cha, et al, "Simulated Behaviour of Large Scale SCI Rings and Tori," Depts. of Engineering and Computer Science, University of Cambridge, United Kingdom, pp. 1–21, Proceedings of 5th IEEE Symposium on Parallel and Distributed Processing, Dallas, Texas, Dec. 1993.

Franklin, et al, "ARB: A Hardware Mechnism for Dynamic Reordering of Memory References," IEEE Transactions on Computers, vol. 45, No. 5, May 1996, pp. 552–571.

Barroso, et al, "Performance Evaluation of the Slotted Ring Multiprocessor," IEEE Transactions on Computers, vol. 44, No. 7, Jul. 1995, pp. 878–890.

Bhuyan, et al, "Approximate Analysis of Single and Multiple Ring Networks," IEEE Transactions on Computers, vol. 38, No. 7, Jul. 1989, pp. 1027–1040.

Arden, et al, "Analysis of Chordal Ring Network," IEEE Transactions on Computers, Vo. C–30, No. 4, Apr. 1981, pp. 291–301.

Kubiatowicz et al, "The Alweife CMMU: Addressing the Multiprocessor Communications Gap," Extended Abstract for Hot Chips '94, 1994, pp. 1–3.

Kubiatowicz et al, "The Anatomy of a Message in the Alewife Multiprocessor," Proceedings of the International Conference on Supercomputing (ICS) 1993, pp. 195–206, Jul. 1993.

PCI Local Bus–*PCI Multimedia Design Guide*–Revision 1.0–Mar. 29, 1994.

IBM Technical Disclosure Bulletin, Apr. 1995, vol. 38, "Micro Channel Architecture for Real Time Multimedia," pp. 535–538.

IBM Technical Disclosure Bulletin, Oct. 1992, vol. 35, "Extended Micro Channel for Realtime Multimedia Applications," pp. 8–10.

IBM Technical Disclosure Bulletin, May 1989, vol. 31, "Priority Scheduling Algorithm," pp. 271–272.

Patent Abstracts of Japan, JP2048765, Feb. 19, 1990.

Peripheral Component Interconnect (PCI) Revision 1.0 Specification, Jun. 22, 1992, cover page and pp. 26–33.

VARIABLE LATENCY AND BANDWIDTH COMMUNICATION PATHWAYS

CONTINUATION DATA

This is a continuation-in-part of application Ser. No. 08/559,661 titled "Computer System Including A Multimedia Bus Which Utilizes A Separate Local Expansion Bus For Addressing and Control Cycles," filed Nov. 20, 1995 U.S. Pat. No. 5,754,807, whose inventors were Andy Lambrecht and Steve Belt, and which was assigned to Advanced Micro Devices, Inc.

BACKGROUND OF THE INVENTION

1. Field of the Invention

This invention relates to computer chips in general and, more particularly, to a system and method for determining communications routing on a computer chip using latency and bandwidth criteria.

2. Description of Related Art

Computer systems have traditionally comprised a system unit or housing which comprises a plurality of electrical components comprising the computer system. A computer system typically includes a motherboard which is configured to hold the microprocessor and memory and the one or more busses used in the computer system. The motherboard typically comprises a plurality of computer chips or electrical components including intelligent peripheral devices, bus controllers, processors, bus bridges, etc.

More recently, computer systems are evolving toward an integration of functions into a handful of computer chips. This coincides with the ability of chip makers to place an increasingly large number of transistors on a single chip. For example, currently chip manufacturers are able to place up to ten million transistors on a single integrated circuit or monolithic substrate. It is anticipated that within several years chip makers will be able to place one billion transistors on a single chip. Thus, computer systems are involving toward comprising a handful of computer chips, where each computer chip comprises a plurality of functions. The integration of a plurality of modules or functions on a single computer chip requires an improved data transfer chip architecture. Also, due to the shorter distances and tighter integration of components on a chip, new data transfer architectures are necessary to take advantage of this environment. Therefore, an improved system and method is desired for including routing communications between a plurality of different functions or modules on a single computer chip.

SUMMARY OF THE INVENTION

The present invention comprises a system and method for selecting communication pathways for data transfers on a computer chip based on desired latency and bandwidth characteristics. Broadly speaking, the present invention comprises a computer chip including a network of resources, wherein those resources are allocated based upon the needs of the computer chip. Typical resources on the computer chip include a first bus with a plurality of data lines and control lines and having first bandwidth and latency characteristics, a second bus with a plurality of data lines and control lines having second bandwidth and latency characteristics, and a plurality of devices coupled to the first bus and second bus. Each of the plurality of devices includes interface logic for accessing the first bus and the second bus and performing transfers on the first bus and the second bus. Each of the plurality of devices is operable to select either the first bus or the second bus depending on desired bandwidth and latency characteristics.

The first bandwidth and latency characteristics may comprise a first bandwidth and a first latency and the second bandwidth and latency characteristics may comprise a second bandwidth and a second latency. Normally the first bandwidth is greater than the second bandwidth. Each of the plurality of devices is operable to select the first bus for higher speed transfers or the second bus for lower speed transfers. When the first latency is shorter than the second latency, each of the plurality of devices is operable to select the first bus for lower latency transfers and the second bus for higher latency transfers. When the first bus operates according to a first clock with a first clock rate, each of the plurality of devices is operable to adjust the first clock rate of the first clock pending on the desired bandwidth and latency characteristics for the data transfer. When the second bus operates according to a second clock with a second clock rate, each of the plurality of devices is operable to adjust the second clock rate of the second bus, depending upon desired bandwidth and latency characteristics of the data transfer. When the first and second buses are operable to transfer data according to a first and second block size, each of the plurality of devices is operable to adjust the first and second block sizes for any given data transfer depending on the desired bandwidth and latency characteristics of that data transfer. With the first bus and the second bus operable to transfer data according to a first bus protocol and a second bus protocol, respectively, each of the plurality of devices is operable to select a different bus protocol for the first bus and the second bus depending upon desired bandwidth and latency characteristics. When the bandwidth needs exceed the resource limit of the higher bandwidth bus, the devices may then request a multiple bus transfer using the resources of the buses combined.

BRIEF DESCRIPTION OF THE DRAWINGS

A better understanding of the present invention can be obtained when the following detailed description of the preferred embodiment is considered in conjunction with the following drawings, in which.

Figure 1:
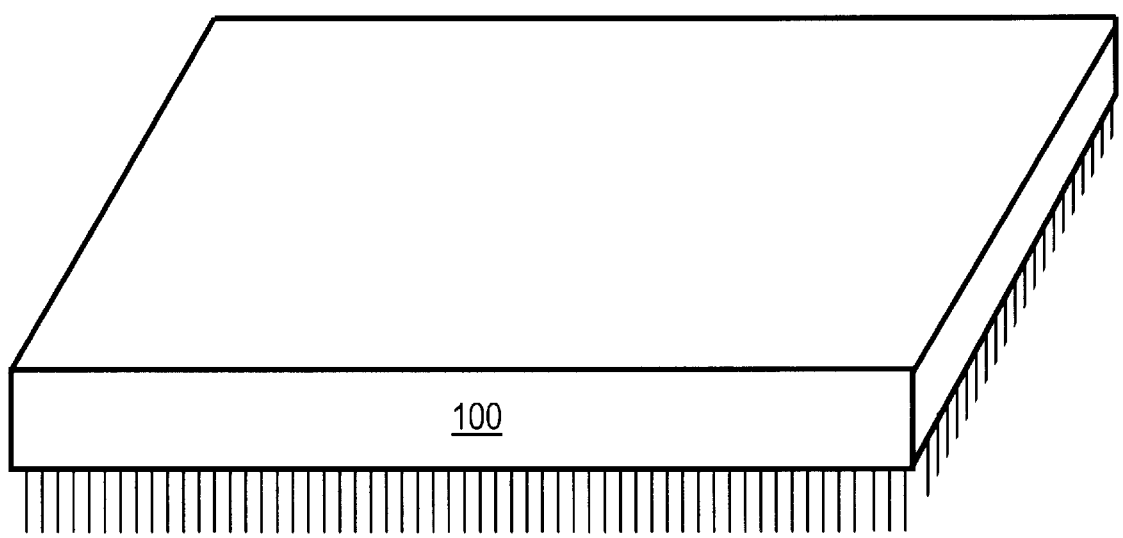
FIG. 1 illustrates a computer chip comprising an on-chip data transfer network using transfer pathways having differing bandwidths and latencies according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF PREFERRED EMBODIMENTS

Incorporation by Reference

The following U.S. patent applications are hereby incorporated by reference in their entirety as though fully and completely set forth herein:

U.S. Pat. No. 5,682,484 titled "System and Method for Transferring Data Streams Simultaneously on Multiple Buses in a Computer System," filed Nov. 20, 1995 (Docket No. 5000-36200), whose inventors were Andy Lambrecht and Steve Belt;

U.S. patent application Ser. No. 08/892,074 titled "Data Transfer Network on a Chip Utilizing a Mesh of Rings Topology" filed Jul. 14, 1997 (Docket No. 5000-95700), whose inventor was Alfred C. Hartmann; and U.S. patent application Ser. No. 08/970/691 titled "Data Transfer Network on a Computer Chip Using a Configurable Path Multiple Ring Topology" filed Nov. 14, 1997, whose inventors were Gary Michael Godfrey and Alfred C. Hartmann.

The use of a letter as part of a number designating a component of a system described in this document will be to show multiple instances of equivalent components. All figures will use a uniform numbering system with identical parts across the figures being given identical numbers.

Referring now to FIG. 1, a computer chip 100 is shown from a perspective view. Computer chip 100 preferably comprises a monolithic silicon substrate comprising a plurality of transistors. The computer chip 100 may also use gallium arsenide (GaAs) or another suitable semiconductor material; the computer chip 100 may also use optical transmission. Although shown as a ceramic socket mount pin grid array (PGA) package, the computer chip 100 may be packaged in any of various ways, including as a surface mount, socket mount, or insertion/socket mount. Materials used in the packaging of computer chip 100 may include ceramic packages, leadless chip carrier packages (LCC), glass-sealed packages, or plastic packages. Actual type of chip package for computer chip 100 may include, ceramic quad flatpack (CQFP), PGA, ceramic dual in-line package (C-DIP), LCC socket or surface mount, ceramic dual in-line package (CERDIP), ceramic quadpack (CERQUAD), small outline package gull wing (SOP), small outline package J-lead (SOJ), thin small outline package (TSOP) etc. and may have any of various types of connectivity including pin grid array (PGA), ball grid array (BGA), direct chip attach (DCA), metal bands or pins etc. Also usable is the controlled collapse chip connection (C4) method, commonly known as the "flip chip" method.

In one embodiment, computer chip 100 utilizes a plurality of buses configured in a circular topology to interconnect multiple module types on a single computer chip 100, preferably using intelligent buffering and a universal port design. Each module is connected to a communications pathway with a full duplex, general purpose communications port, thus allowing for heterogeneous and homogeneous module types to form a networked system on a single computer chip. The present invention allows "system on a chip" producers to integrate module designs from different sources or module core vendors. This promotes integration of "best of breed" cores from an evolving industry of "virtual component" suppliers. Further details of the components of the computer chip will be given in the descriptions of FIGS. 2–8.

Figure 2:
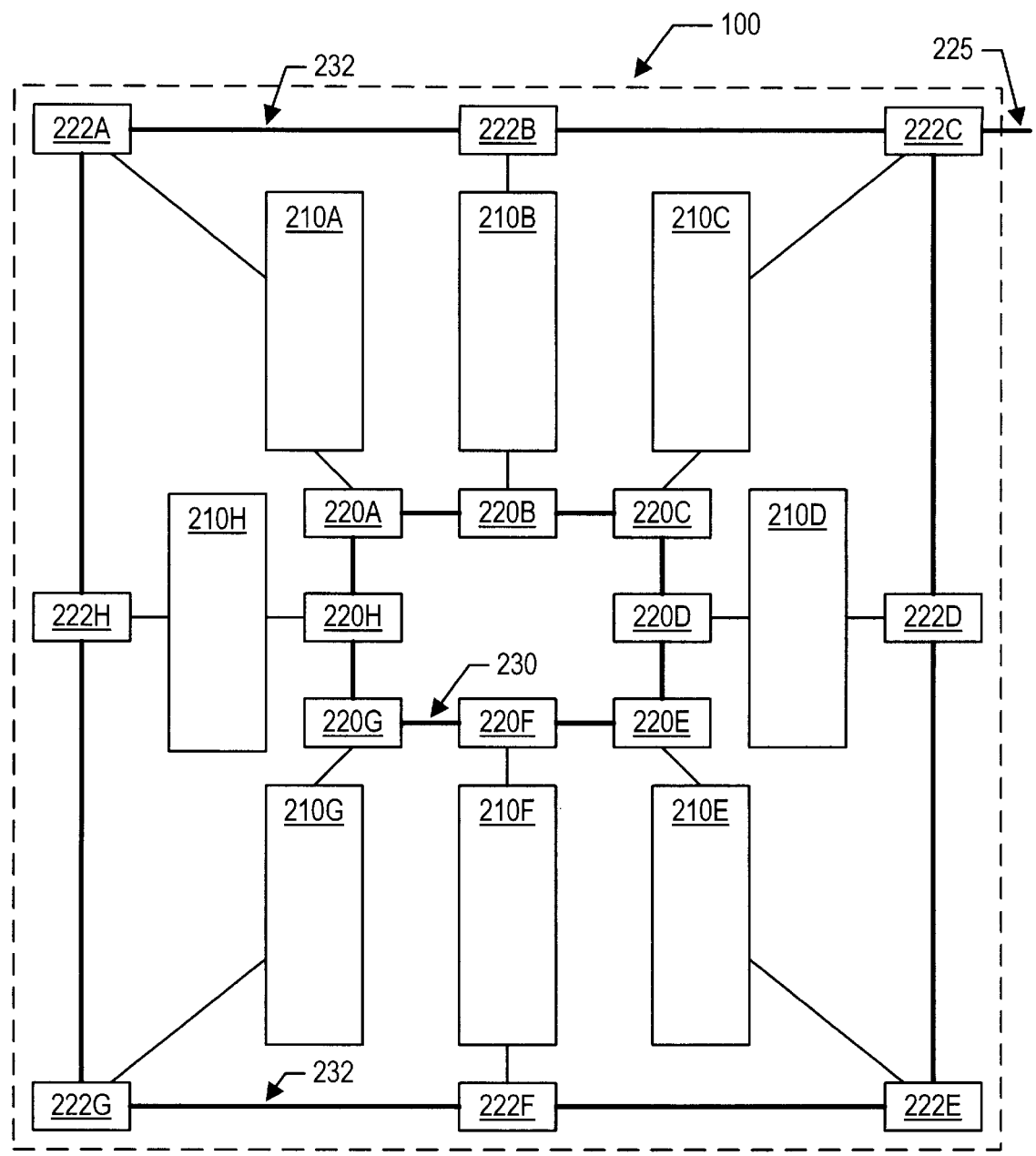
FIG. 2 illustrates an embodiment of the data transfer network shown in FIG. 1.

Referring now to FIG. 2, an embodiment is shown of computer chip 100 with a data transfer network utilizing a multiple circular topology for interconnecting a plurality of modules 210A–210H on a single computer chip 100 in an on-chip network. When a reference is made to a component and its associated number, such as module 210, that reference may refer to any of the components with that associated number, such as modules 210A–210H, with or without an additionally associated letter. The components of the network preferably include a plurality of buses, such as buses 230 and 232, in FIG. 1 which provide an electrical path for data communications between the plurality of modules 210 comprised on the computer chip 100. It is noted that although the embodiment of FIGS. 2 and 3 include two buses 230 and 232, a greater number of buses may be included, as desired. When a reference is made to bus 230 or 232, that reference may refer to any part associated with bus 230 or 232, including any sections labeled with an associated letter designation, such as 230A.

The modules 210 preferably perform operations, and modules may be devices such as a processor, an I/O controller, or storage (memory), or a hybrid device which performs multiple tasks, like a task-specific hybrid (ASIC) or a task-general hybrid. Additional details concerning the modules 210 may be found below in reference to FIG. 6. A plurality of communications ports 220A–220H and 222A–222H are also comprised on the computer chip 100. Each of the plurality of communications ports 220 and 222 is coupled to one or more of the buses 230 or 232. Each of the communications ports 220 and 222 is operable to route data from a source bus 230 or 232 or section thereof to a destination bus 230 or 232 or section thereof.

In the embodiment of FIG. 2, computer chip 100 includes, moving in a clockwise fashion from upper left, from the outside in, communications ports 222A–222H coupled to bus 232 in a circular topology. Each communications ports 222A–222H is further coupled to an associated module 210A–210H. Each module 210A–210H is further coupled to an associated communications port 220A–220H which are collectively coupled to bus 230 in a circular topology. Other couplings for the modules 210 are possible, such as to another module 210 or to additional communications ports 220 or 222. Communications port 222C is shown with an additional connection 225 of bus 232 which may be used to couple computer chip 100 to another computer chip.

Each of the buses 230 or 232 may be unidirectional, that is, only transmitting data in one direction. For unidirectional buses 230 or 232, each bus 230 or 232 preferably transmits data in a direction opposite to its nearest neighbor bus 230 or 232. For example, when a first bus 230 or 232 is operable to transfer data in a first direction, a second bus 230 or 232 is operable to transfer data in a second opposite direction. One or more of the buses 230 or 232 may transfer data in two directions. Any bus 230 or 232 may also include addressing and control lines in addition to data lines. Other special function lines may also be included in buses 230 or 232 as desired.

The communications ports 220 or 222 may be physically separate or incorporated into the modules 210. An incorporated communications port 220 or 222 in a module 210 would perform in a similar fashion to transmit and receive data on one or more of the buses 230 or 232. One or more of the communications ports 220 or 222 may be further operable to transfer data from one of the buses 230 or 232 to a bus connection, such as communications port 220 or 222 operable to route data to a device off of the computer chip 100. Special notice is taken of additional connection 225 of bus 232 of FIG. 2 as an example of an off-chip extension of the connections. Additional details of communications ports 220 or 222 may be found below in reference to FIG. 7.

In another embodiment, the data transfer network of computer chip 100, preferably includes a plurality of communications ports 220 or 222 comprised on the computer chip 100 as well as a plurality of transfer paths 230 or 232 comprised on the computer chip 100 along with a plurality of modules 210. Each of the plurality of transfer paths 230 or 232 are directly connected between two of the communications ports 220 or 222 with a first group of the plurality of transfer paths 230 and a first group of the plurality of communications ports 220 collectively forming a first traffic circle and with a second group of the plurality of transfer paths 232 and a second group of the plurality of communications ports 222 collectively forming a second traffic circle different from the first traffic circle. Each of the plurality of communications ports 220 or 222 is coupled to at least two transfer paths 230 or 232. Each of the plurality of communications ports 220 or 222 is operable to route data from a source transfer path 230 or 232 to a destination transfer path 230 or 232. Each of the plurality of modules 210 is coupled to at least one of the plurality of communications ports 220 or 222, and the plurality of modules 210 are operable to communicate with each other through the transfer paths 230 or 232.

In this embodiment, at least a subset of the plurality of modules 210 are coupled to one or more communication ports 220 in the first group of the plurality of communication ports 220 in the first traffic circle. This subset of modules 210 are further coupled to one or more communication ports 222 in the second group of the plurality of communication ports 222 in the second traffic circle. A further subset of the plurality of modules 210 are operable to communicate through the first traffic circle and the second traffic circle.

In one embodiment, each of the groups of transfer paths 230 or 232 is operable to transfer data in only one direction. The preferred direction is the direction opposite to the direction of the other group of transfer paths 230 or 232. In another embodiment, each bus or transfer path 230 or 232 is operable to transfer data in any direction available.

Another embodiment of computer chip 100 includes a first circular bus 230 comprised on the computer chip 100, a second circular bus 232 comprised on the computer chip 100, a plurality of communication ports 220 and 222 comprised on the computer chip 100, and a plurality of modules 210. Each of the first and second circular buses 230 and 232 is configured in a circular topology, and each of the first and second circular buses 230 and 232 is operable to transfer data in a circular fashion. The plurality of communication ports 220 and 222 comprised on the computer chip 100 are coupled to one or more of the first circular data bus 230 and the second circular data bus 232 and are operable to route data from a source to a destination. Each of the plurality of modules 210 is coupled to at least one of the plurality of communication ports 220 or 222 and is operable to communicate with each other through one or more of the buses 230 and 232.

Figure 3:
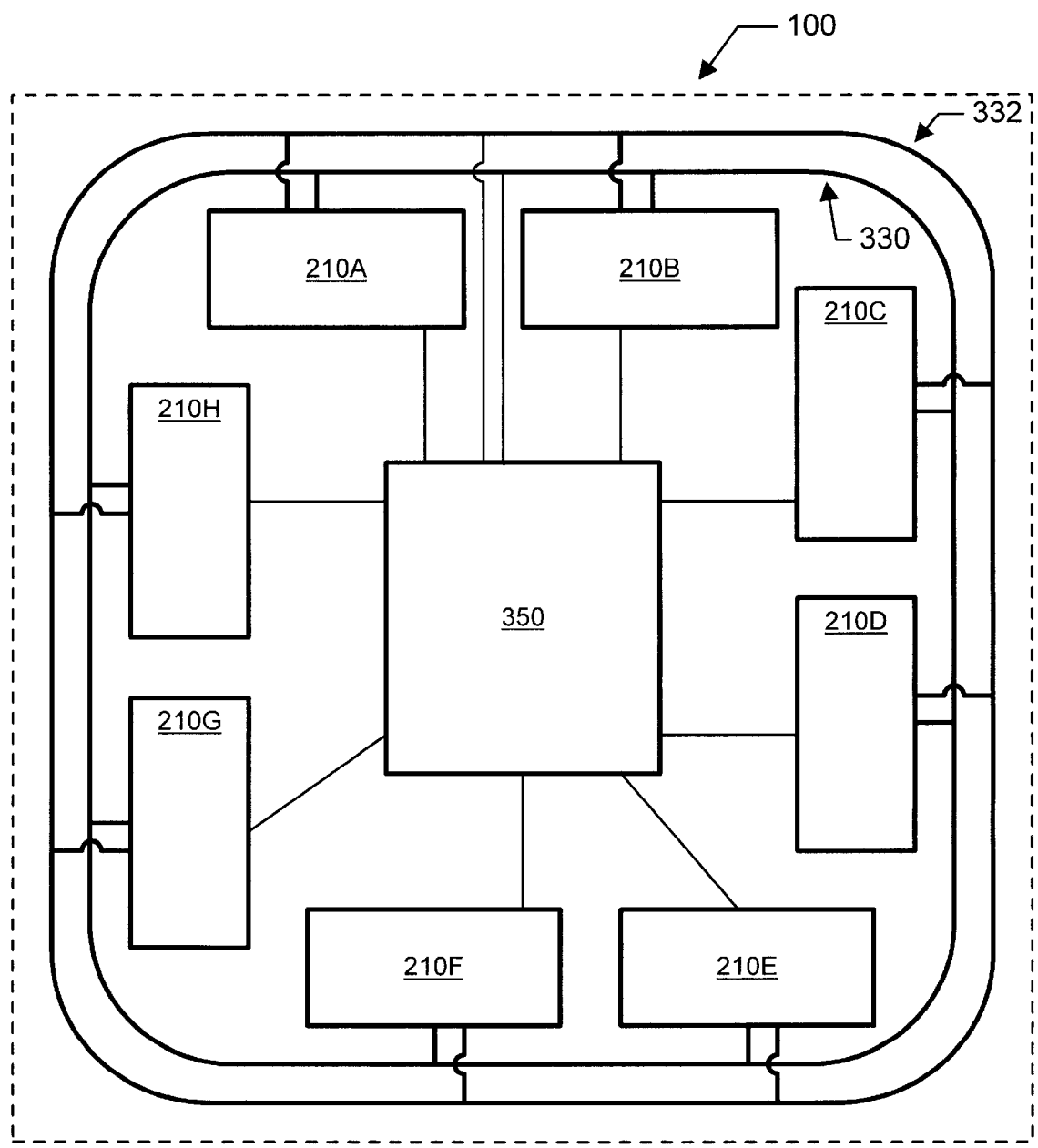
FIG. 3 illustrates another embodiment of the data transfer network shown in FIG. 1.

Referring now to FIG. 3, another embodiment is shown of computer chip 100 with an on-chip data transfer network utilizing a multiple circular topology for interconnecting a plurality of modules 210A–210H on a single computer chip 100. A primary difference between FIG. 2 and FIG. 3 is the coupling of a bus controller 350 to buses 330 and 332 for controlling the transfer of data on buses 330 and 332. Some details of FIG. 3 are described in detail in reference to FIG. 2 using the uniform numbering scheme. The components of the network preferably include a plurality of buses represented in FIG. 3 as buses 330 and 332 which provide an electrical path for data communications between the plurality of modules 210 comprised on the computer chip 100. The numbers 230 and 232 are used for the buses or transfer paths of FIG. 2; the numbers 330 and 332 are used for the buses or transfer paths of FIG. 3. Although the buses 330 and 332 are shown external to the grouping of modules 210, the buses 330 and 332 could also be internal and/or external as suggested by FIG. 2.

In this embodiment, the data transfer network comprises a plurality of buses or transfer paths 330 and 332 linking the plurality of modules 210 through communications ports included in each module 210. The plurality of modules may be coupled to one or more of the buses 330 and 332 and are operable to communicate with each other through the buses 330 and 332 using the communications ports incorporated into each module 210.

The bus controller 350 comprised on computer chip 100 is coupled to one or more of the plurality of buses 330 and 332. The bus controller 350 is operable to control data transfers by the modules 210 on or through the buses 330 and/or 332. The bus controller 350 includes arbiter logic for arbitrating access to the buses 330 and/or 332. Other logic may be incorporated into the bus controller as necessary for control, protocol translation, or other desired function.

Figure 4:
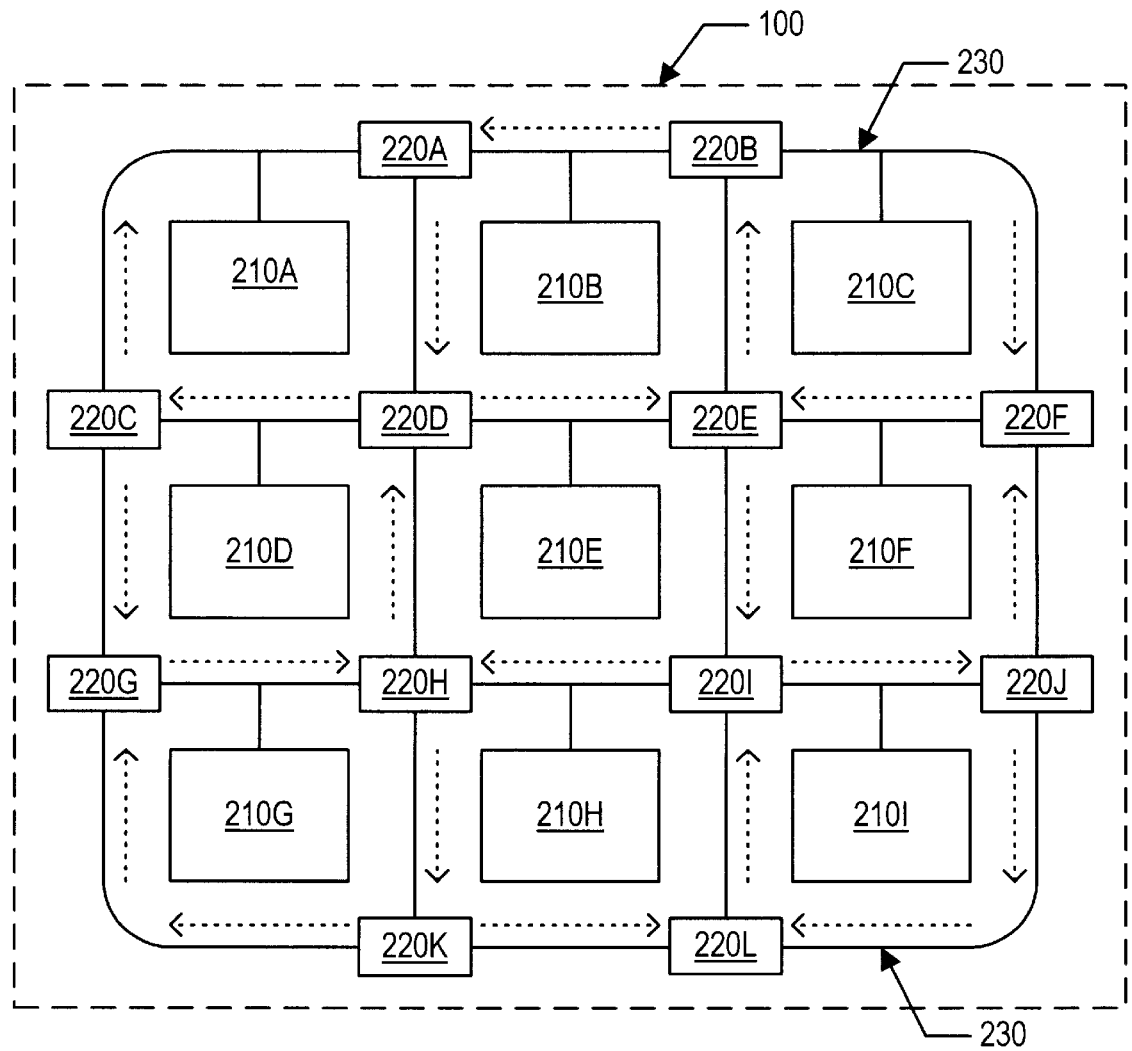
FIG. 4 illustrates yet another an embodiment of the data transfer network shown in FIG. 1.

Referring now to FIG. 4, an embodiment is shown of computer chip 100 with a data transfer network utilizing a mesh of rings topology for interconnecting a plurality of modules 210A–210I on a single computer chip 100 in an on-chip network. The components of the network preferably include a plurality of buses 230 which provide an electrical path for data communications between the plurality of modules 210 comprised on the computer chip 100. Note that bus 230H may preferably refer to the four sections or transfer paths of bus 230 which enclose module 210H, linking switchpoints 240H, 240K, 240L and 240I. Bus 230 may also be links 230 as desired, providing point-to-point communications.

The modules 210 preferably perform operations, and modules may be devices such as a processor, an I/O controller, or storage (memory), or a hybrid of tasks, like a task-specific hybrid (ASIC) or a task-general hybrid. A plurality of switchpoints 240A–240L, also referred to as bus switchpoints 240, are comprised on computer chip 100 interconnecting the buses 230.

In the embodiment of FIG. 4, the system includes, moving from top to bottom, left to right, modules 210A to 210I, in three rows of three modules, each surrounded by buses 230A through 230I. The plurality of buses 230 are collectively configured in a mesh of rings such that a portion of each bus 230 is also a portion of one or more adjacent buses 230. Each bus 230 includes at least three transfer paths, and a subset of buses 230 include four transfer paths. For example, bus 230A (circulating clockwise) comprises three sections or transfer paths of bus 230 interconnecting switchpoints 240A, 240D, and 240C. Bus 230B (circulating counterclockwise) comprises four sections or transfer paths of bus 230 interconnecting switchpoints 240A, 240D, 240E and 240B. Thus buses 230A and 230B both include a section or transfer path of bus 230 between switchpoints 240A and 240D where the adjacent counter-circulating flows merge in a common direction on the shared link. Modules 210A–210I are shown coupled to their respective bus 230 on the topmost segment of the bus 230. Other locations for the module 210 coupling are possible, such as to another segment of bus 230 or to one or more switchpoints operable to route data to the module 210.

In the embodiment of FIG. 4, the twelve switchpoints 240 are arranged in a two-four-four-two geometry with corner switchpoints 240 not included at the "corners" of the chip 100. One way to define a corner switchpoint is a switchpoint that is a part of only one bus 230, e.g., a corner switchpoint is never shared between two or more buses 230. In an alternative embodiment, corner switchpoints may be included for off-chip communications to extend the mesh of rings over multiple chips. Similarly, any of the edge switchpoints, 220A, 220B, 220F, 220J, 22L, 220K, 220G, or 220C, may have external connectors and/or connections for extending the network off-chip to one or more additional chips. The dotted arrows in FIG. 4 refer to the preferred direction of data movement on bus 230. In general, the preferred direction is clockwise in the upper left-most ring and then alternating counter-clockwise and clockwise for adjacent rings, as shown.

The data transfer network of computer chip 100 preferably includes a plurality of buses 230 comprised on the computer chip 100. Each of the plurality of buses 230 is configured in a ring topology with the plurality of buses 230 configured as a mesh of rings. Each of the plurality of buses 230 includes a portion which is shared with a portion of another of the buses 230. A plurality of bus switchpoints 220 comprised on the computer chip 100 are positioned at intersections of the mesh of rings comprised of the plurality of buses 230. Each of the bus switchpoints 220 is operable to route data from a source bus 230 to a destination bus 230, which may be the same bus 230. A plurality of modules 210 coupled to at least one of the plurality of buses 230 are operable to communicate with each other through the buses 230 via the switchpoints 220. Additional details concerning the modules 210 are given below in reference to FIG. 6.

In one embodiment, each of the plurality of buses 230 is operable to transfer data in only one direction. The preferred direction is the direction shown in FIG. 4 by the dotted arrows. A subset of the plurality of bus switchpoints 220 may be coupled to receive data from first or second transfer paths and provide said data to first, second, third or fourth transfer paths. The preferred direction for data transfer from a module 210 and a bus 230 is to and from the module 210 and the bus 230. In another embodiment, each bus 230 is operable to transfer data in any direction available.

The plurality of bus switchpoints 220 includes a first plurality of external bus switchpoints 220, such as switchpoints 220A, 220B, 220C, 220F, 220G, 220J, 220K and 220L, and a second one or more internal bus switchpoints, such as switchpoints 220D, 220E, 220H and 220I. In addition, the corner switchpoints referred to above would be external bus switchpoints. The simplest mesh of rings structure data transfer network with both external and internal switchpoints 220 would be a two by two structure with four external switchpoints 220 and one internal switchpoint 220.

Figure 5:
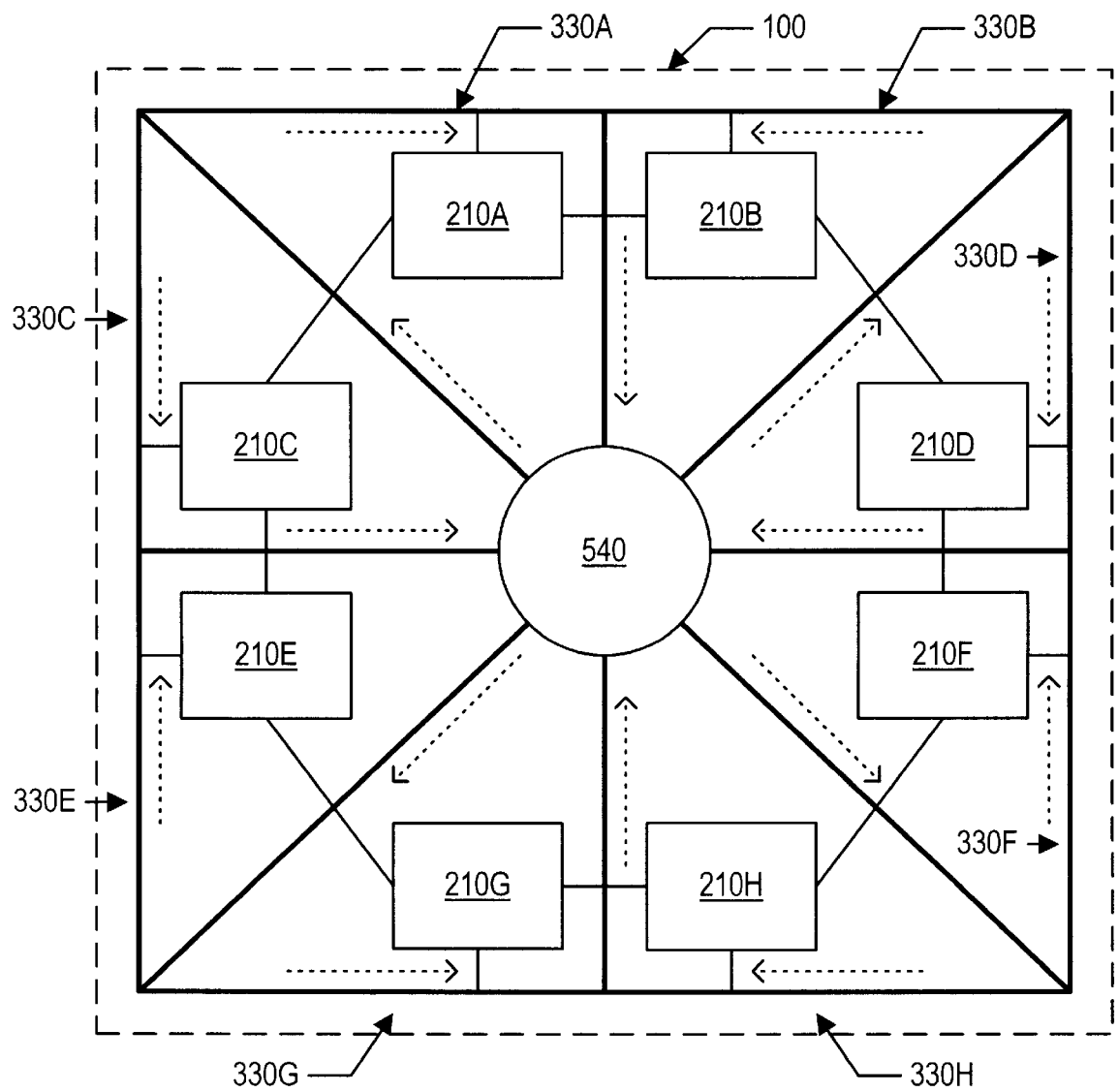
FIG. 5 illustrates still another embodiment of the data transfer network shown in FIG. 1.

Referring now to FIG. 5, another embodiment is shown of computer chip 100 with a data transfer network utilizing a mesh of rings, ring of rings or polygonal hub topology for interconnecting a plurality of modules 210A–210H on the single computer chip 100. The components of the network preferably include a plurality of buses 330 which provide an electrical path for data communications between the plurality of modules 210 comprised on the computer chip 100.

This embodiment of computer chip 100 includes a plurality of buses 330 configured in a multiple ring topology. The plurality of buses 330 are configured as a ring of rings where each of the plurality of buses 330 includes a portion which is shared with a portion of another bus 330. All buses have a common intersection at a switchpoint 540 operable as a hub to route data from one or more source buses 330 to one or more destination buses 330. FIG. 5 illustrates a central switchpoint 540 surrounded by modules 210A–210H in a circular fashion. Switchpoint 540 is similar to the switchpoints 220 shown in FIGS. 2 and 4. Each module 210A–210H is coupled to a respective bus 330A–330H on a shared portion of the respective bus 330. The location on the bus 330 for the coupling allows for adjacent modules to transfer data without using the bus 330 or the switchpoint 540. The modules 210 are also preferably operable to communicate with each other through the buses 330 and/or the switchpoint 540. Other locations for coupling module 210 are contemplated, such as to the switchpoint 540. The modules 210 are operable to communicate with each other through the buses 330 and/or the switchpoint 540.

The dotted arrows illustrate the preferred unidirectional flow of data on the buses 330. Other directions and bi-directional flow are also contemplated. In the preferred embodiment, the data transfer network comprises only one switchpoint 540 positioned at the common intersection of the mesh of rings comprising said plurality of buses 330. This solo switchpoint 540 is operable to route data between each of the plurality of buses 330. Additional details relating to FIG. 5 are described in reference to other figures according to the uniform numbering scheme. It is noted that the buses 330 may also be described as transfer links for point-to-point communications as opposed to multidrop buses.

The plurality of devices 210 comprised on the computer chip 100 are coupled to both the first bus 230/330 and the second bus 232/332. Each device 210 includes interface logic 610, as will be described with respect to FIG. 6, for accessing the first bus to 30/330 and the second bus 330/332 as well as performing transfers. Each of the plurality of devices 210 is operable to select either the first bus 230/330 or the second bus 232/332 for any given data transfer depending upon the desired bandwidth and latency characteristics for that data transfer. The first bus 230/330 and the second bus 232/332, both being comprised on the computer chip 100, preferably include a plurality of data lines and control lines.

The first bus 230/330 has first bandwidth and latency characteristics, while the second bus 232/332 has second bandwidth and latency characteristics. The first bandwidth and latency characteristics include a first bandwidth and a first latency. The second bandwidth and latency characteristics include a second bandwidth and a second latency. The first and second bandwidth and latency characteristics may also include a first clock and a second clock, with a first clock rate and a second clock rate, respectively. Also includable in the first and second bandwidth and latency characteristics are a first block size and a second block size, as well as a first bus protocol and a second bus protocol. Further operating characteristics for a bus or transfer paths may also be included in the bandwidth and latency characteristics as desired.

For higher speed transfers, each device 210 is operable to select the bus 230/330/232/332 which is capable of higher speed transfers, wherein each device 210 is further operable to select another bus 230/330/232/332 for slower speed transfers. A device 210 is also operable to adjust the clock rate of the clock of a bus 230/330/232/332 based on the bandwidth and latency needs of that device 210 for that data transfer. Also adjustable are the blocks size, either smaller or larger, as well as selecting a different bus protocol for the bus depending on desired bandwidth and latency characteristics for that data transfer. Noted that the first bus 230/330 and the second bus 232/332 may be configured in a ring, or interlocking ring, structure.

When the bandwidth needs exceed the resource limit of the higher bandwidth bus, the devices may then request a multiple bus transfer using the resources of the buses combined. Further details are available from U.S. Pat. No. 5,682,484 titled "System and Method for Transferring Data Streams Simultaneously on Multiple Buses in a Computer System," which has been previously incorporated by reference.

Figure 6:
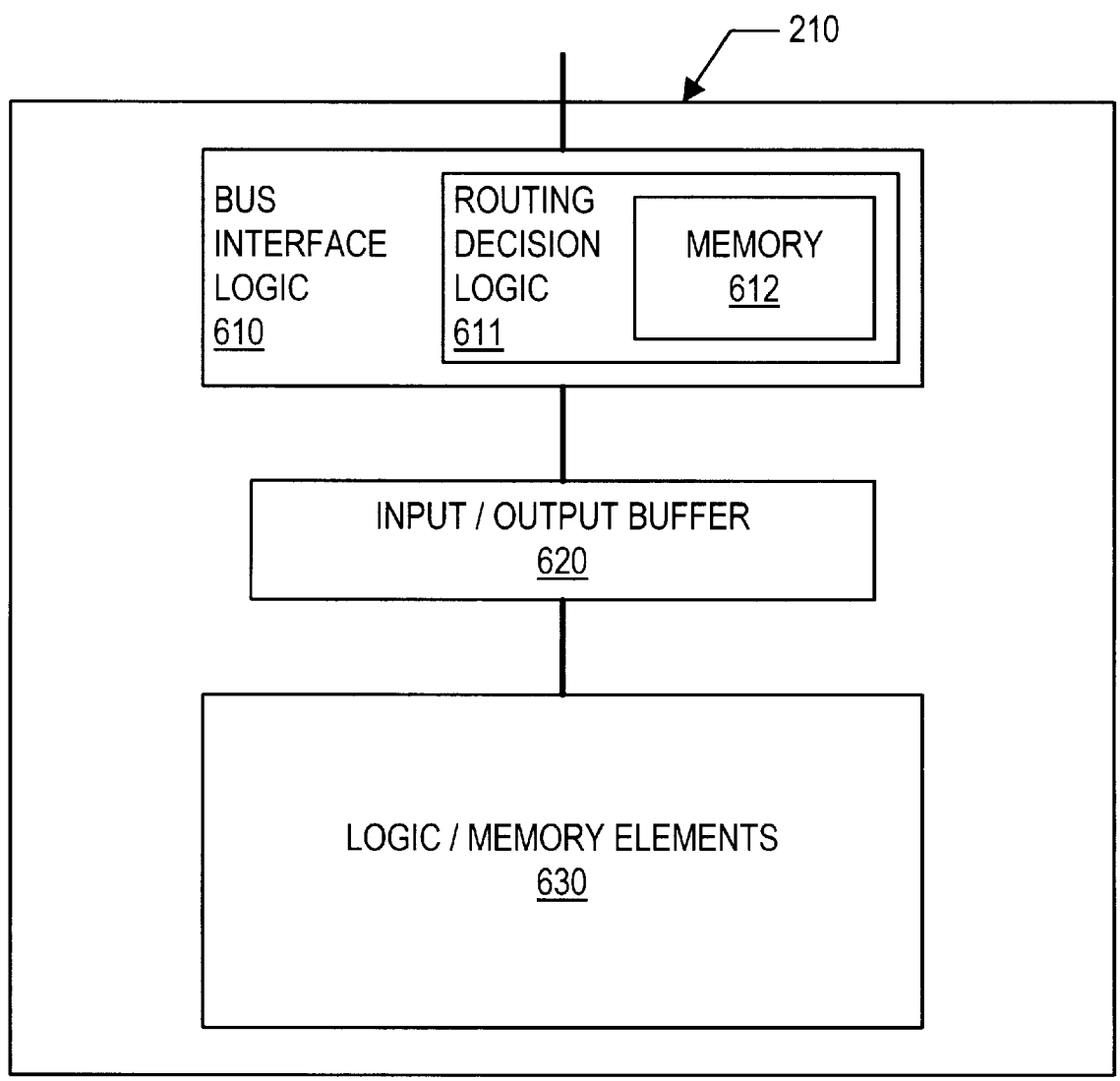
FIG. 6 illustrates an embodiment of a module.

Referring now to FIG. 6, a module 210 is shown. Each module 210 is preferably one of the group which includes processors, memories or hybrids. A processor may be a CPU, FPU, or an I/O controller in any of the variety of possible forms. A memory may be a RAM, ROM, hybrid memory or active memory in any of the variety of possible forms. Hybrids may be task-specific, like an ASIC, or task-general.

Each module may couple to a bus 230 or 232, a bus 330 or 332, a communications port 220 or 222 or other device as desired using bus interface logic 610 either incorporated in the module 210 or as part of a communications port 220 or 222 physically imposed between the module 210 and the circular bus 230 or 232, etc. A communications port is operable to transmit and receive data on the transfer paths 230 or 232 or buses 330 or 332 either when comprised in the module 210 or independent. Bus interface logic 610 preferably includes routing decision logic 611. The routing decision logic 611 operates to choose one pathway or another or one bus or another based upon the module's 210 needs. If one pathway has a higher bandwidth than another pathway and the module needs the higher bandwidth pathway, then the routing decision logic 611 will choose the higher bandwidth pathway. The pathways may be bus 230 and bus 232 or bus 330 and bus 332, as alternate choices, or the pathways may be collections of transfer paths or collections of connections between the source module 210 and the destination for the data transfer. The bus interface logic 610 preferably includes a memory 612 for storing bandwidth, latency and/or other information about the routes available to module 210. The memory 612 may be comprised of memory cells or it may be comprised of registers, as desired.

Module 210 preferably transmits and receives data from other modules 210 via an input/output buffer 620 coupled to the bus interface logic 610 and the logic/memory elements 630 of the module 210. Other components with or without other couplings may also comprise the module 210 as desired.

Figure 7:
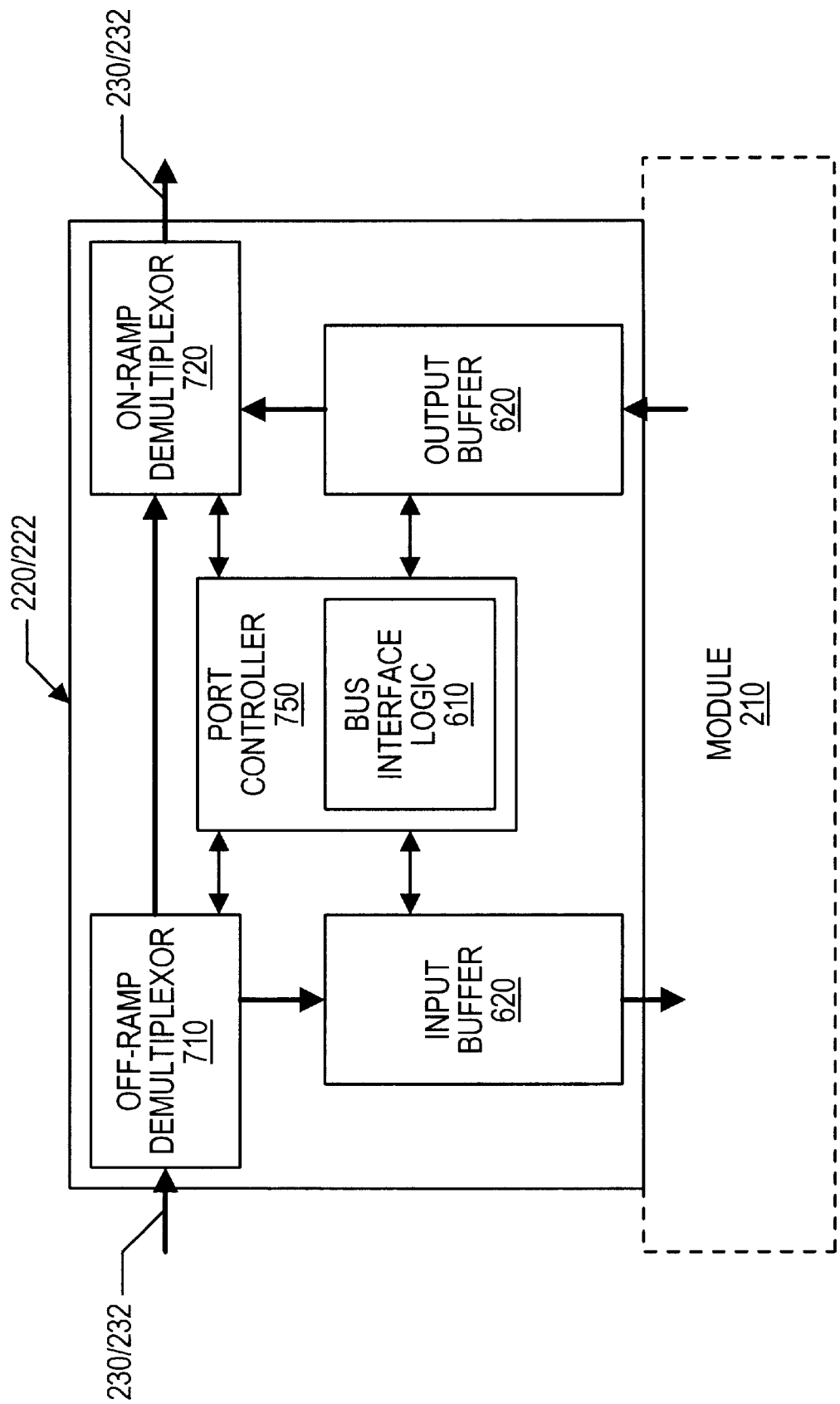
FIG. 7 illustrates an embodiment of a communications port.

Referring now to FIG. 7, an embodiment is shown of the internal details of an communications port 220 or 222 for coupling a module 210 comprised on a computer chip 100 to a circular bus 230 or 232 for receiving and sending communications between one or more additional modules 210 comprised on the computer chip 100. The communications port 220 or 222 preferably includes an "off-ramp" demultiplexer 710 for coupling to the circular bus 230 or 232 providing for the off-ramp demultiplexer 710 receiving data from the bit sliced bus 230. An "on-ramp" multiplexer 720 preferably couples to the circular bus 230 or 232 and provides data onto the circular bus 230 or 232. The on-ramp multiplexer 720 further couples to the off-ramp demultiplexer 710, and the off-ramp demultiplexer 710 operates to provide data to the on-ramp multiplexer 720 for "through traffic". An input buffer 620 preferably couples to the off-ramp demultiplexer 710, and the input buffer 620 includes connections (not shown) for coupling to the module 210. An output buffer 620 preferably couples to the on-ramp multiplexer 720, and the output buffer 620 also includes connections (not shown) for coupling to the module 210.

The off-ramp demultiplexer 710 operates to receive data from the circular bus 230 or 232 and demultiplex a portion of the data intended for the module 210 and provide the portion of the data intended for the module 210 to the input buffer 620. The input buffer 620 operates to receive and store the portion of the data intended for the module 210 and provide the portion of the data intended for the module 210 to the module 210 as the module 210 signals a readiness to accept the data. The output buffer 620 operates to receive and store output data from the module 210 and provide the data from the module 210 to the on-ramp multiplexer 720. The on-ramp multiplexer 720 operates to receive the output data from the module 210 and multiplex the data from the module 210 with other data received from the off-ramp demultiplexer 710 to form multiplexed data. The on-ramp multiplexer 720 further operates to provide the multiplexed data to circular bus 230 or 232.

The communications port 220 or 222 preferably also includes a port controller 750 coupled to control the operations of the off-ramp demultiplexer 710, the on-ramp multiplexer 720, the input buffer 620, and the output buffer 620. The means of port controller 750 may also be incorporated within the other individual components of the communications port 220 or 222 as desired. The preferred operation of the port controller 750 includes providing clocking signals to each of the off-ramp demultiplexer 710, the on-ramp multiplexer 720, the input buffer 620, and the output buffer 620. The port controller 750 also preferably includes bus interface logic 610.

As each module 210 preferably includes a unique address, the port controller 750 preferably further operates to receive addresses of received data from the off-ramp demultiplexer 710 and determine if the unique address of the module 210 is present. The port controller 750 then operates to direct the off-ramp demultiplexer 710 to provide data associated with the unique address of the module 210 to the input buffer 620 if the port controller 750 determines that the unique address of the module 210 is present. Alternatively, the address decoding logic is comprised in the off-ramp demultiplexer 710, or in specialized address decoding logic coupled to the off-ramp demultiplexer 710.

Bus interface logic 610 for accessing the on-chip circular bus 230 or 232 and performing data transfers on the on-chip circular bus 230 or 232 is preferably comprised in port controller 750 but may also be comprised in off-ramp demultiplexer 710, on-ramp multiplexer 720 or another component comprised in module 210 or communications port 220. Bus interface logic 610 may also be separate from other parts of module 210 or communications 220 or 222. Additional details relating to FIG. 7 are described in reference to other figures according to the uniform numbering scheme.

Figure 8:
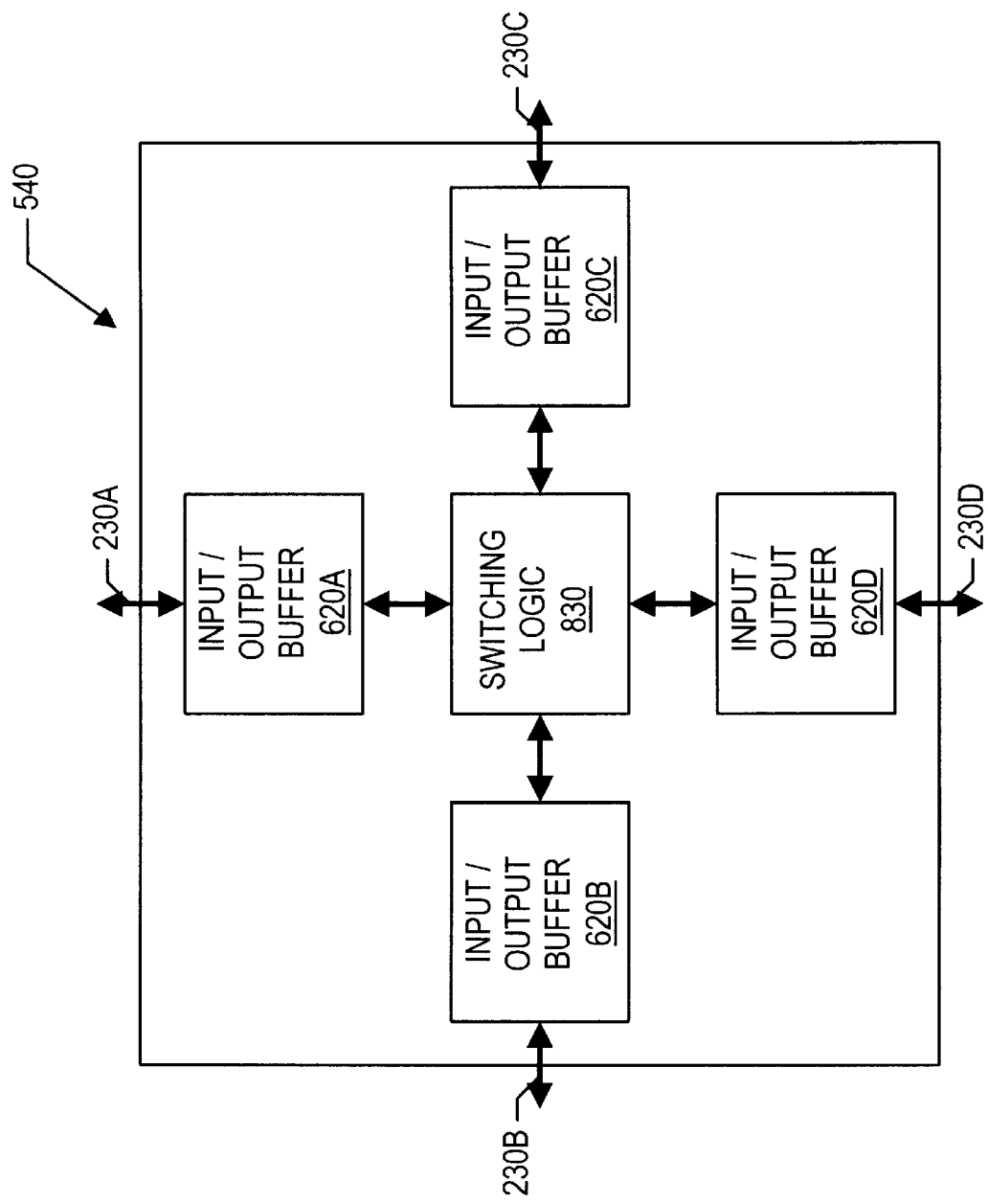
FIG. 8 illustrates an embodiment of a switchpoint.

Referring now to FIG. 8, a switchpoint 540 is shown; for illustrative purposes, the illustrated switchpoint 540 it is a four by four switchpoint 540 with four inputs and four outputs. Other numbers of inputs and outputs are contemplated, including switchpoints 540 with physically separate inputs and outputs. All descriptions of switchpoints 540 may also be applied to a switchpoint 350 operating as a central hub in a ring topology as a mesh of rings comprised of buses 330/332. In the preferred embodiment, switchpoint 540 would include more input/output connections than the four by four shown. As shown, the switchpoint 540 comprises four couplings to bus 230 labeled 230A through 230D. The switchpoint 540 couples to the bus 230 through input/output buffers 620A–620D, respectively. Each input/output buffer 620 couples to switching logic 830 which controls the routing of all data that passes through the switchpoint 540.

The data transfer network preferably includes a plurality of bus switchpoints 540 comprised on the computer chip 100 and positioned at intersections of the mesh of rings made up of the plurality of buses 230. Each switchpoint 540 is operable to route data from a source bus 230 to a destination bus 230. Any number of buses 230 may be coupled to any given switchpoint 540. Preferably, at least a subset of the plurality of bus switchpoints 540 is coupled to receive data from first or second buses 230 and provide the received data to first, second, third or fourth buses 230. The plurality of switchpoints 540 may be divided in many cases into a first plurality of external bus switchpoints 230 and a second one or more internal bus switchpoints 230. External bus switchpoints 230 are usually coupled to more buses 230 than internal bus switchpoints 230. Additional details relating to FIG. 8 are described in reference to other figures according to the uniform numbering scheme.

Therefore, the present invention comprises a system and method for choosing either a first data path or a second data path depending upon desired bandwidth and latency characteristics of the first and second data paths. Although the system and method of the present invention have been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer chip which includes a network of resources, the computer chip comprising:

a first bus comprised on the chip, wherein said first bus includes a plurality of data lines and control lines, wherein said first bus has first bandwidth and latency characteristics;

a second bus comprised on the chip, wherein said second bus includes a plurality of data lines and control lines, wherein said second bus has second bandwidth and latency characteristics, wherein said second bandwidth and latency characteristics differ from said first bandwidth and latency characteristics;

a plurality of devices comprised on the chip coupled to said first bus and to said second bus, wherein each of said devices includes interface logic for accessing said first bus and said second bus and performing transfers on said first bus and said second bus;

wherein each of said plurality of devices is operable to select either said first bus or said second bus depending on desired bandwidth and latency characteristics.

2. The computer chip of claim 1, wherein said first bandwidth and latency characteristics comprises a first bandwidth and a first latency;

wherein said second bandwidth and latency characteristics comprises a second bandwidth and a second latency;

wherein said first bandwidth is greater than said second bandwidth;

wherein each of said plurality of devices is operable to select said first bus for higher speed transfers, and wherein each of said plurality of devices is operable to select said second bus for lower speed transfers.

3. The computer chip of claim 1, wherein said first bandwidth and latency characteristics comprises a first bandwidth and a first latency;

wherein said second bandwidth and latency characteristics comprises a second bandwidth and a second latency;

wherein said first latency is shorter than said second latency;

wherein each of said plurality of devices is operable to select said first bus for lower latency transfers, and wherein each of said plurality of devices is operable to select said second bus for higher latency transfers.

4. The computer chip of claim 1, wherein said first bus operates according to a first clock, wherein said first clock has a first clock rate;

wherein each of said plurality of devices is operable to adjust said first clock rate of said first clock depending on desired bandwidth and latency characteristics.

5. The computer chip of claim 1, wherein said second bus operates according to a second clock, wherein said second clock has a second clock rate;

wherein each of said plurality of devices is operable to adjust said second clock rate of said second clock depending on desired bandwidth and latency characteristics.

6. The computer chip of claim 1, wherein said first bus is operable to transfer data according to a first block size;

wherein each of said plurality of devices is operable to adjust said first block size of a data transfer depending on desired bandwidth and latency characteristics.

7. The computer chip of claim 6, wherein said second bus is operable to transfer data according to a second block size;

wherein each of said plurality of devices is operable to adjust said second block size of a data transfer depending on desired bandwidth and latency characteristics.

8. The computer chip of claim 1, wherein said first bus is operable to transfer data according to a first bus protocol;

wherein each of said plurality of devices is operable to select a different bus protocol for said first bus depending on desired bandwidth and latency characteristics.

9. The computer chip of claim 8, wherein said second bus is operable to transfer data according to a second bus protocol;

wherein each of said plurality of devices is operable to select a different bus protocol for said second bus depending on desired bandwidth and latency characteristics.

10. The computer chip of claim 1, wherein said first bus and said second bus are configured in a ring structure.

11. A method for transferring high bandwidth data on multiple buses in a computer chip, wherein the computer chip comprises a first bus which transfers data, a second bus which transfers data, and a plurality of devices coupled to the first bus and the second bus, the method comprising:

a first device generating addressing and control signals on the first bus for a bus transfer, wherein the bus transfer is intended for a second device;

the first device generating one or more signals on the first bus indicating a multiple bus transfer is desired;

the second device receiving the addressing and control signals on the first bus for the bus transfer;

the first device performing a plurality of bus transfers comprising data, wherein said plurality of bus transfers comprise transfers simultaneously on data lines of both the first bus and the second bus, wherein said transfers simultaneously on data lines of both the first bus and the second bus are performed in response to said generating one or more signals on the first bus indicating a multiple bus transfer is desired.

12. The method of claim 11, further comprising:

the second device providing one or more signals on the first bus to the first device indicating said multiple bus transfer can proceed, wherein said providing one or more signals on the first bus to the first device indicating said multiple bus transfer can proceed occurs in response to the second device receiving the one or more signals on the first bus indicating said multiple bus transfer is desired.

13. The method of claim 12, further comprising:

wherein the first device generating one or more signals on the first bus indicating a multiple bus transfer is desired includes the first multimedia device transferring information regarding said multiple bus transfer.

14. The method of claim 13, wherein said information regarding said multiple bus transfer includes information indicating respective byte lanes where said multiple bus transfers will occur.

15. The method of claim 14, further comprising:

the second device determining if the second device can guarantee availability to receive data on both the first bus and the second bus;

wherein the second device providing said one or more signals on the bus to the first device indicating said multiple bus transfer can proceed is performed in response to the second device determining that the second device can guarantee availability to receive data on both the first bus and the second bus.

16. The method of claim 11, wherein said first bus and said second bus are bit sliced buses.

17. The method of claim 11, wherein said multiple bus transfers comprise transfers of periodic multimedia data, wherein said periodic multimedia data comprises motion video data at a plurality of frames per second and said periodic multimedia data comprises audio data at a plurality of cycles per second.

18. The method of claim 17, wherein said multiple bus transfers comprise transferring said motion video data on a first one of either said first bus or said second bus, and also transferring said audio data on the other of either said first bus or said second bus.

19. The method of claim 11, wherein said plurality of bus transfers comprise transfers of first data on data lines of the first bus and transfers of second data on data lines of the second bus, wherein said first data is different than said second data.

20. A computer chip which includes a network of resources, the computer chip comprising:

a first bus comprised on the chip, wherein said first bus includes a plurality of data lines and control lines, wherein said first bus has first bandwidth and latency characteristics;

a second bus comprised on the chip, wherein said second bus includes a plurality of data lines and control lines, wherein said second bus has second bandwidth and latency characteristics, wherein said second bandwidth and latency characteristics differ from said first bandwidth and latency characteristics;

a plurality of devices comprised on the chip coupled to said first bus and to said second bus, wherein each of said devices includes interface logic for accessing said first bus and said second bus and performing transfers on said first bus and said second bus;

wherein each of said devices includes:

means for generating one or more signals on the first bus to a target device indicating a transfer comprising data is desired;

means for generating one or more signals on the first bus to a target device indicating a multiple bus transfer is desired;

means for receiving one or more signals on the first bus from a source device indicating a transfer comprising data is desired;

means for receiving one or more signals on the first bus from a source device indicating a multiple bus transfer is desired;

means for performing a plurality of multiple bus transfers comprising data to the target device using both the first bus and the second bus, wherein said plurality of multiple bus transfers using both the first bus and the second bus are performed in response to operation of said means for generating one or more signals on the bus to a target device indicating a multiple bus transfer is desired.

21. The method of claim 20, wherein said means for receiving includes means for providing one or more signals on the first bus to a source device indicating a multiple bus transfer can proceed, wherein said means for providing operates in response to the target device receiving the one or more signals on the first bus indicating said multiple bus transfer is desired.

22. The method of claim 20, wherein said means for generating transfers information regarding said multiple bus transfer to the target device.

23. The method of claim 22, wherein said information regarding said multiple bus transfer includes information indicating respective byte lanes where said multiple bus transfers will occur.

24. The method of claim 23, wherein said means for receiving determines if the target device can guarantee availability to receive data on both the first bus and the second bus;

wherein said means for receiving provides one or more signals on the first bus to the source device indicating said multiple bus transfer can proceed in response to the means for receiving determining that the target device can guarantee availability to receive data on both the first bus and the second bus.

25. The method of claim 20, wherein said first bus and said second bus are bit sliced buses.

26. The method of claim 20, wherein said multiple bus transfers comprise transfers of periodic multimedia data, wherein said periodic multimedia data comprises motion video data at a plurality of frames per second and said periodic multimedia data also comprises audio data at a plurality of cycles per second.

27. The method of claim 26, wherein said means for performing said multiple bus transfers said motion video data on a first one of either said first bus or said second bus, and also transfers said audio data on the other of either said first bus or said second bus.

28. A method for choosing a preferred pathway for a data transfer on a computer chip, wherein said computer chip comprises a plurality of pathways including a first pathway which transfers data and a second pathway which transfers data, and a plurality of devices, including a first device and a second device, coupled to the first pathway and coupled to the second pathway, the method comprising:

the first device choosing the preferred pathway for the data transfer based on one or more of the group consisting of available pathways for the data transfer, latency and bandwidth needs of the first device for the data transfer, overall power management needs of the computer chip, and an ability of the computer chip to create new pathways;

the first device generating address and control signals on the preferred pathway for the data transfer, wherein the data transfer is intended for the second device;

the first device sending the data transfer over the preferred pathway; and the second device receiving the data transfer over the preferred pathway.

* * * * *